United States Patent [19]

Vollrath

[11] Patent Number: 5,671,655
[45] Date of Patent: Sep. 30, 1997

[54] TWO-PIECE CONNECTING ROD FOR A RECIPROCATING HERMETIC COMPRESSOR

[75] Inventor: Ingwald Vollrath, Joinville SC, Brazil

[73] Assignee: Empresa Brasileira De Compressores S/A - Embraco, Joinville - SC, Brazil

[21] Appl. No.: 481,449

[22] PCT Filed: Oct. 18, 1994

[86] PCT No.: PCT/BR94/00031

§ 371 Date: Aug. 31, 1995

§ 102(e) Date: Aug. 31, 1995

[87] PCT Pub. No.: WO95/11382

PCT Pub. Date: Apr. 27, 1995

[30] Foreign Application Priority Data

Oct. 19, 1993 [BR] Brazil ............................. 9304034

[51] Int. Cl.⁶ .............................................. F01B 29/00
[52] U.S. Cl. .......................... 92/128; 92/187; 74/579 E; 123/197.1
[58] Field of Search .................. 92/187, 128; 74/579 R, 74/579 E; 123/197.1, 197.2, 197.3, 197.4

[56] References Cited

U.S. PATENT DOCUMENTS

| | | | |
|---|---|---|---|
| 4,407,168 | 10/1983 | Andrione et al. | 74/579 E |
| 4,802,382 | 2/1989 | Nissels | 74/579 E |
| 4,930,405 | 6/1990 | Lilie | 92/128 |
| 5,143,470 | 9/1992 | Jimenez et al. | 403/149 |

FOREIGN PATENT DOCUMENTS

| | | |
|---|---|---|
| 31 11 947 | 10/1982 | Germany. |
| 86 13 993 | 10/1986 | Germany. |
| 4 164/74 | 6/1992 | Japan. |
| 2211272 | 6/1989 | United Kingdom. |
| 2 078337 | 12/1992 | United Kingdom. |
| WO 9218781 | 10/1992 | WIPO. |

*Primary Examiner*—Thomas E. Denion
*Attorney, Agent, or Firm*—Darby & Darby

[57] ABSTRACT

A two-piece connecting rod for a reciprocating hermetic compressor, of the type comprising a first connecting rod portion (20), including a smaller eye (21) and the rod (22) of the connecting rod, and a second connecting rod portion (30), including a larger eye (31), and further comprising: an engaging element (23), provided at one of the parts defined by the first and second connecting rod portions (20, 30); a receiving housing (32), provided at the other of said parts and shaped in such a way as to receive during the assembly of the connecting rod the engaging element (23), and permit the articulation between the first and second connecting rod portions (20, 30), at a diametral plane common to both the eyes and the geometrical axis of the rod (22) of the connecting rod, and mounting means (40), carried by one of said first and second connecting rod portions (20, 30) and acting on the other of said portions, in order to prevent said portions from moving away from each other, by involuntary mutual axial spacing at said common diametral plane.

6 Claims, 3 Drawing Sheets

TWO-PIECE CONNECTING ROD FOR A RECIPROCATING HERMETIC COMPRESSOR

FIELD OF THE INVENTION

The present invention refers to a two-piece connecting rod to be mounted in a reciprocating hermetic compressor used in small machines, such as refrigerators, freezers, drinking fountains, etc.

BACKGROUND OF THE INVENTION

The reciprocating compressors present a connecting rod, which has a smaller eye articulated through a wrist pin to a reciprocating piston inside the cylinder of the compressor, and a larger eye mounted to an eccentric end of a crankshaft, which is orthogonal to the piston stroke, the other end of said crankshaft supporting the rotor of an electric motor, whereas the stator of the motor is supported on a cylinder block, lodging the bearing of the crankshaft, the block being mounted inside a case by means of springs, said case being closed by a cover, which defines a sealed unit.

In order to obtain a better performance of the compressor, it is important from the mechanical point of view that the parts with relative movement present perfect adjustments of their geometries, so as to avoid leakages, wear and minimize the frictions that lead to a loss of volumetric yielding.

Alterations in this characteristic of the piston affect the operation of the compressor.

Due to the small dimensions of the components and to the little space available for mounting the piston-connecting rod-eccentric pin assembly, different constructive solutions have been proposed for such assembly.

The document 4832/73/BR presents a constructive form, in which the spacing ring is pressed between the larger eye of the connecting rod and the eccentric pin. To permit assembling, this larger eye of the connecting rod has an internal diameter larger than the eccentric pin, the clearance therebetween being occupied by the above cited spacing ring. Besides requiring a rather complex mounting, such solution further requires careful manufacturing, in order to obtain precision of the components involved.

The documents PI 8103673/BR and EPO 81830119.4 propose as solution a slot in the lateral wall of the cylinder, in order to allow that the smaller eye of the connecting rod and the piston pin be introduced in the piston during the mounting process. Said slot in the cylinder wall has the disadvantage of reducing the rigidity of the part, causing dimensional deviations during the machining of the cylinder.

The document DE 3123708 A1 refers to a connecting rod, which has its larger eye divided in two pieces, the latter being joined through clamps. Nevertheless, this solution has a high number of components for a part, which would be simple in principle, besides keeping in movement an excessively increased mass.

Another constructive solution for a two-piece connecting rod is described in the patent application PI8501182/BR, in which the larger eye of the connecting rod incorporates a radial projection, provided with a longitudinal slot, which occupies at least a portion of the thickness of said radial projection, the smaller eye incorporating an elongated radial projection, defining the rod of the connecting rod, and an end portion, which is fitted in the longitudinal slot of the radial projection of the smaller eye. Although this solution requires a simple mounting of the parts of the two-piece connecting rod, the fastening of said parts is obtained by processes presenting inconveniences, such as the generation of residues during welding, for instance, or the need of long drying periods or variable resistance to time, due to the aging of the material, in the case adhesives are used for this purpose. One solution for fastening the two-piece connecting rod described above is proposed in the document PI8707047/BR, in which a fastening clamp is disposed in a housing, which is defined during the assembly of the portions of the two-piece connecting rod, and which is in the form of a slot provided at the portions of the rod of the connecting rod projecting from each of the larger and smaller eyes, transversely to the axis that joins both centers of said larger and smaller eyes. However, this solution requires high precision in the machining of the slot that defines the housing of the fastening clamp at the portions of the two-piece connecting rod, in order to allow the fastening of said portions by said fastening clamp during the assembly of said two-piece connecting rod.

Nevertheless, there are known solutions aiming to solve this problem, in which the connection of the portions of the two-piece connecting rod is achieved by the provision of articulations, usually by using pins. But said solutions usually involve high manufacturing costs, due to the precision required for the components, as well as to mounting difficulties.

Although said solutions minimize the problems of mounting the connecting rod in hermetic compressors, they do not avoid the occurrance of wearing efforts on said connecting rod, during the operation of the compressor, resulting from dimensional deviations of the parts working together with said connecting rod.

DISCLOSURE OF THE INVENTION

Thus, it is the object of the present invention to provide a two-piece connecting rod, which is articulated at a plane, common to both eyes and to the geometrical axis of the rod of the connecting rod, and which is preferably rigid at a plane orthogonal to said common diametral plane, in order to be able to absorb dimensional deviations in the relative positioning of the parts connected to the connecting rod, avoiding misalignments of the eyes and rod of the connecting rod in relation to the common diametral plane, and allowing a simple and fast mounting of the portions, after the mounting of the eyes thereof to the piston-eccentric pin assembly inside the cylinder, without increasing the mass that is going to reciprocate during the operation of the compressor.

This object of the invention is achieved through a two-piece connecting rod for a reciprocating hermetic compressor of the type comprising a first connecting rod portion, including a smaller eye and at least part of the rod of the connecting rod, and a second connecting rod portion, including a larger eye, said eyes being respectively mounted to a piston and to an eccentric pin of the compressor, said connecting rod further comprising: an engaging element, provided at one of the parts defined by the first and second connecting rod portions; a receiving housing, provided at the other of said parts and shaped in such a way as to receive during the assembly of the connecting rod the engaging element, in order to permit an articulation between the first and second connecting rod portions, at a diametral plane common to both the eyes and the geometrical axis of the rod of the connecting rod, said housing including at least a pair of opposite lateral walls, disposed so as to avoid relative movements between said first and second connecting rod portions at a plane orthogonal to said common diametral plane; and mounting means, having engaging portions and being carried by one of said first and second connecting rod portions, and acting on the other of said portions, in order to prevent said portions from moving away from each other, by involuntary mutual axial displacement at said common diametral plane.

The present invention permits to obtain a flexible union of the portions of the connecting rod, without impairing the integrity of the system, and further permits the production of the parts of the piston-connecting rod-eccentric pin assembly with more manufacturing tolerance and economy. The mass, which is maintained at minimum values, contributes to reduce the level of vibration of the assembly and simplify the union of the portions of the connecting rod, thus enabling the automatization of the mounting operations.

BRIEF DESCRIPTION OF THE DRAWINGS

The invention will be described below, with reference to the attached drawings, in which.

BEST MODE FOR CARRYING OUT THE INVENTION

Figure 1:
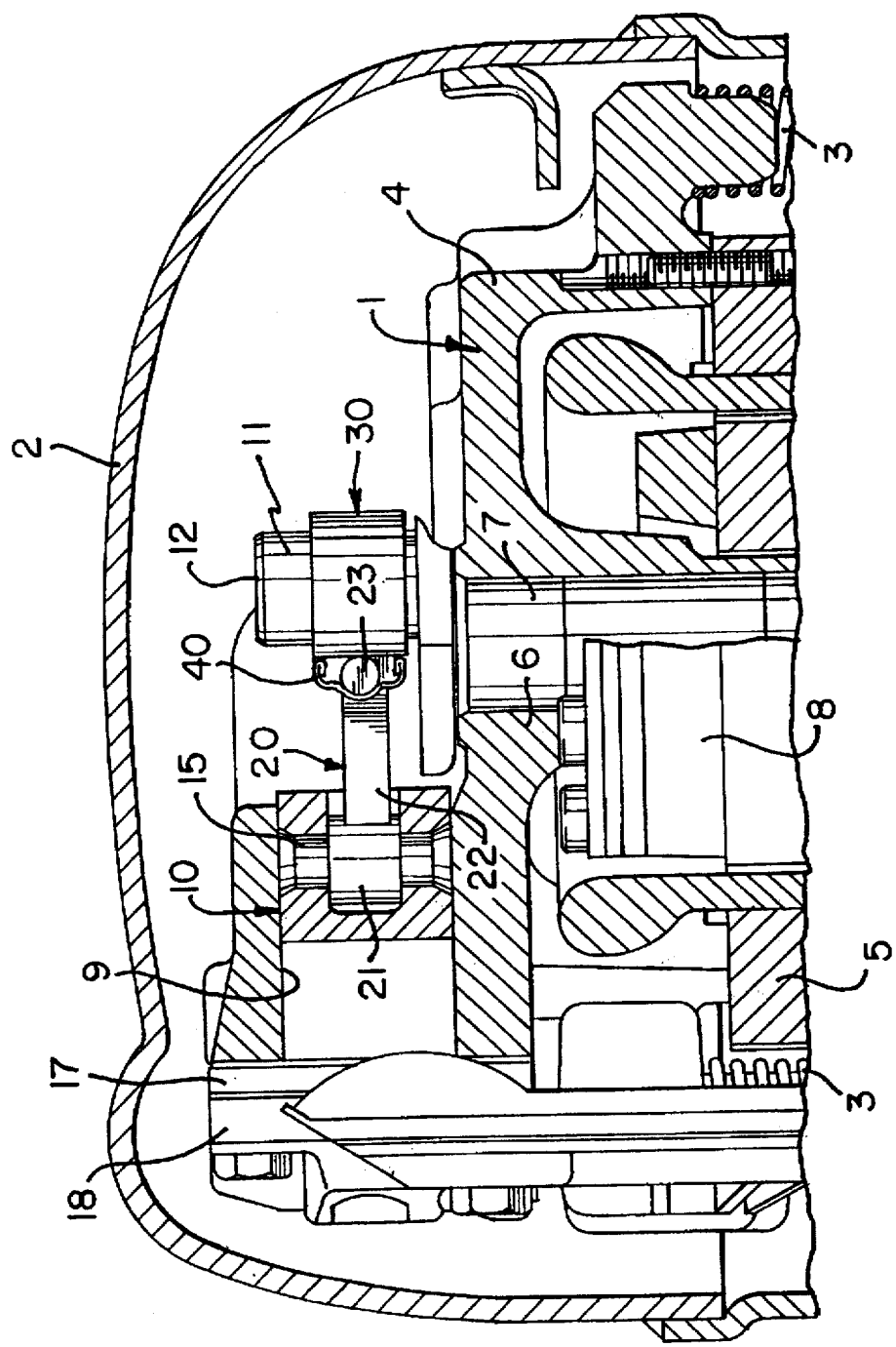
FIG. 1 shows schematically a partial longitudinal section view of a hermetic compressor with a reciprocating piston, according to the present invention.

According to the figures, the motor-compressor assembly 1 is suspended inside a hermetically sealed case 2 through springs 3 (only two are illustrated). A block 4 serves as a support for mounting a stator 5 of the electric motor and is provided with a bearing 6 for supporting a crankshaft 7, in which lower portion the rotor 8 of the motor is mounted. Said block 4 further houses a cylinder 9, within which reciprocates the piston 10. The crankshaft 7 has, at its upper end, an eccentric pin 11 with an upper free end 12.

As it can be observed in FIG. 1, the cylinder 9 receives at its end opposite to the crankshaft 7 a valve plate 17 and a head 18. A two-piece connecting rod, formed by first and second connecting rod portions 20, 30, promotes the connection between the piston 10 and the eccentric pin 11 of the crankshaft 7.

The first connecting rod portion 20 comprises a smaller eye 21 and an elongated radial projection 22, defining the rod of the connecting rod, said rod being incorporated by an end 22a to the smaller eye 21, which is attached inside the piston 10 through a wrist pin 15. The rod 22 further has a free opposite end 22b, which carries an engaging element 23 described ahead.

The second connecting rod portion 30 comprises a larger eye 31, mounted around the eccentric pin 11 of the crankshaft 7 and provided at its external surface with a receiving housing 32 to allow the articulated connection of the engaging element 23 during the mounting of the connecting rod portions.

The engaging element-receiving housing assembly is dimensioned and shaped so as to make the housing 32 act as a stop for the engaging element 23, in order to limit the approach of the larger eye 31 and smaller eye 21, during the mounting of the connecting rod. Moreover, the construction of said receiving housing 32 foresees the actuation thereof as a mounting guide element, as well as a lateral stop element for the engaging element 23, guiding the introduction of the latter in the receiving housing 32 and preventing, during the compressor operation, the engaging element 23 from moving transversely to a diametral plane common to both eyes and to the geometrical axis of the rod of the connecting rod.

In the preferred illustrated form, the engaging element 23 and the receiving housing 32 are equally shaped, so as to present preferably cylindrical concurrent contours.

Nevertheless, the transversal profiles of the receiving housing 32 and engaging element 23 need not fully coincide. It is sufficient that said profiles provide for an articulated mounting at the common diametral plane of the portions of the so formed two-piece connecting rod.

The articulation of the two-piece connecting rod should preferably allow the eyes of said connecting rod to move at the common diametral plane, absorbing dimensional errors or deviations in the alignments of the compressor parts that affect the relative positioning of the parts to which the two-piece connecting rod is connected.

In a preferred illustrated form for carrying out the invention, the engaging element 23 has lateral projections from each lateral face of the rod of the connecting rod 22, which are orthogonal to the common diametral plane and which in the preferred illustrated form define a head portion communicating with the smaller eye 21, through a neck portion defined by the rod 22 of the connecting rod. In this case, said lateral projections project from the free end 22b of said rod 22, transversely to the geometrical axis of the latter.

More particularly, the above described articulation is obtained through an engaging element 23 in the form of a cylindrical body, whose geometrical axis is orthogonal to said common diametral plane.

However, in order to obtain the desired articulation, it is possible to provide other forms to the engaging element 23 and receiving housing 32. The preferred articulation may occur, for example, around a shaft, which may or may not be incorporated to one of the parts defined by the engaging element 23 and receiving housing 32.

The engaging element 23 presents a diameter smaller than a thickness E of the free end 22b of the rod 22, so that a lower portion of said free end 22b defines a lateral guide element 24, which will guide during assembly the introduction of the first connecting rod portion 20 to the second connecting rod portion 30 and will prevent said portions from moving transversely to the common diametral plane. In the present construction, the engaging element 23 is disposed so that its cylindrical surface be tangent to the plane of an upper face of the rod 22.

The difference between the thickness of the rod 22 and the diameter of the engaging element 23 defines the thickness of the lateral guide element 24, acting against the lateral walls of a portion of the housing 32 where there is defined a through axial slot, whose lateral walls act as stops for said lateral guide element 24 after the assembly of the two-piece connecting rod, avoiding the relative lateral movements between the first and second connecting rod portions 20, 30.

According to the drawings, the receiving housing 32 has a bottom wall 33 and axial lateral walls, which define a semi-circular tranversal profile and which are preferably formed by lower radial projections 35 and an upper radial projection 36 of the lateral surface of the larger eye 31. The bottom wall 33 of the housing 32 is defined by a portion of the lateral surface of the larger eye 31 of the two-piece connecting rod.

Figure 2:
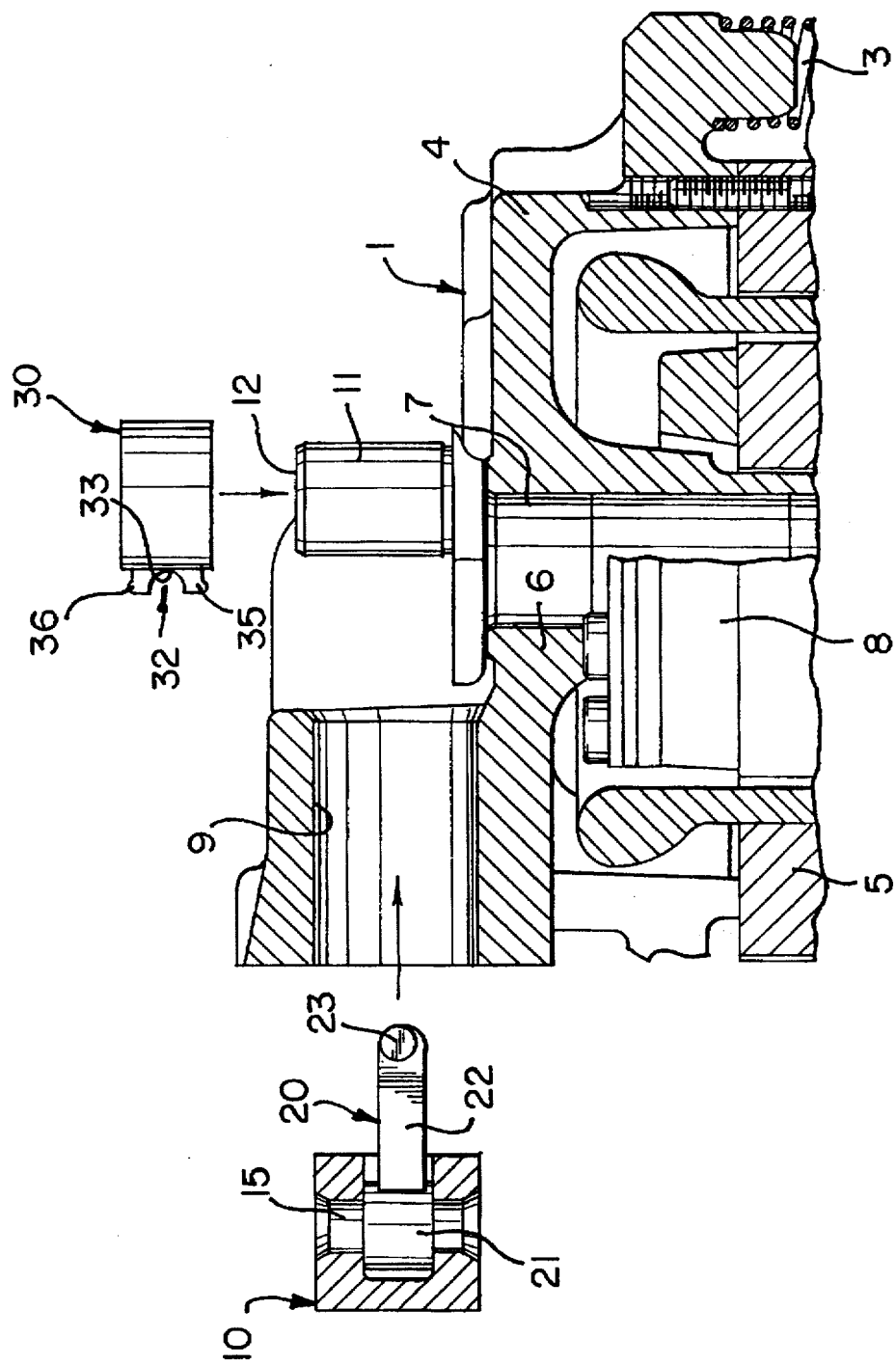
FIG. 2 shows schematically a detail of part of FIG. 1, illustrating the two-piece connecting rod and the piston, exploded in relation to the cylinder of the compressor, before the final mounting of the latter.
Figure 3:
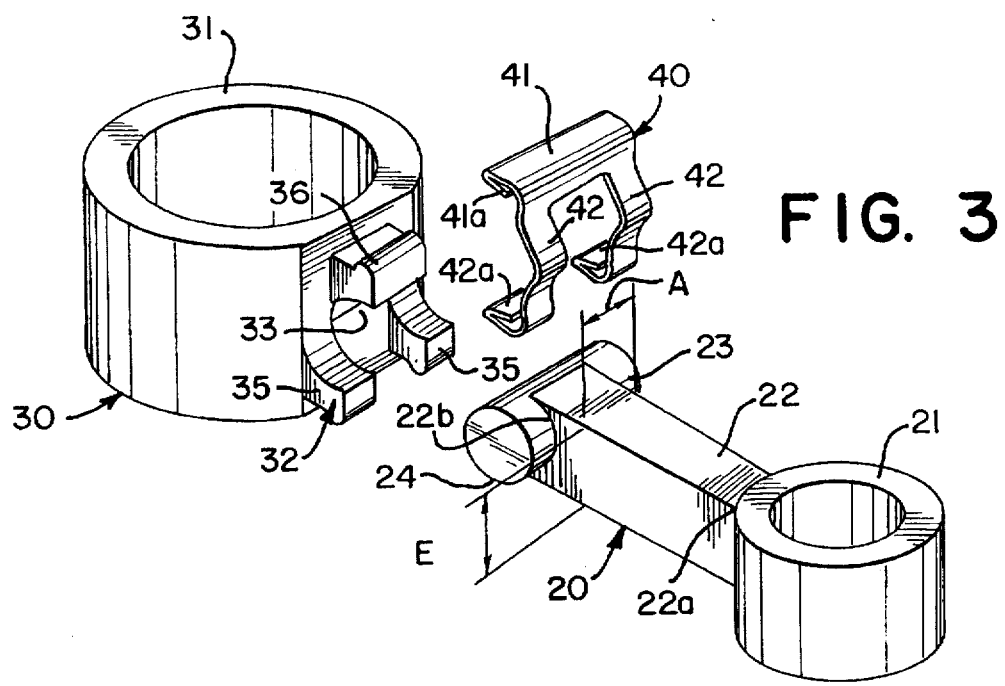
FIG. 3 shows an exploded perspective view of the two portions of the two-piece connecting rod and a mounting means, in the form of a clamp for engaging both said portions.
Figure 4:
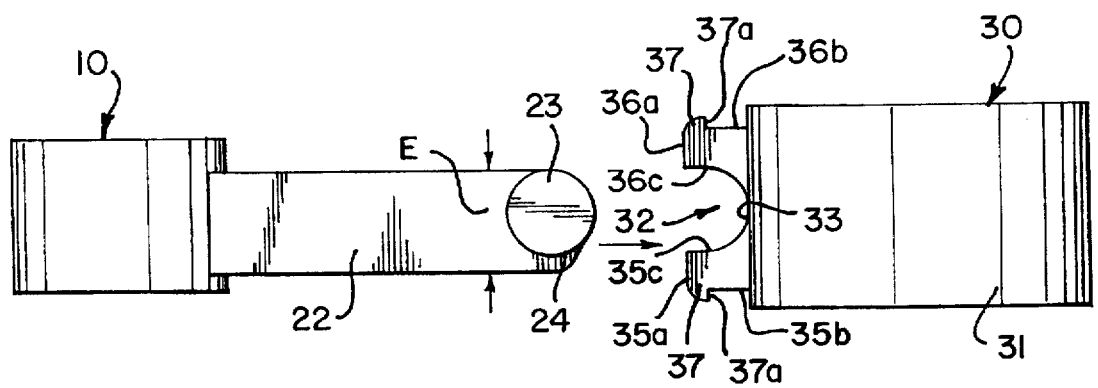
FIG. 4 is a frontal view of the assembly of FIG. 3, but without the clamp.
Figure 5:
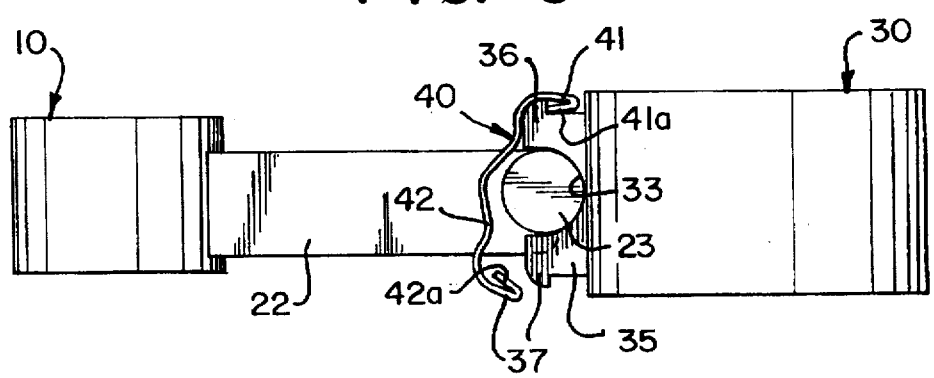
FIG. 5 is a lateral view of the two-piece connecting rod in a mounted condition and with its portions being fastened by the clamp.

In the preferred construction illustrated in FIGS. 2–4, the lower radial projections 35 are spaced from each other by a distance corresponding to a width A of the opposite free end 22b of the first connecting rod portion 20, said distance in this construction also corresponding to the width of the upper radial projection 36. This spacing defines the axial slot cited above and permits the tight fitting of the lateral guide element 24 of said free end 22a between said lower radial projections 35 during the assembly of the two-piece connecting rod in the compressor. In this construction, each lower radial projection 35 has a respective pair of lateral faces 35a, which are parallel to each other, and a pair of lateral faces 36a of the upper radial projection 36.

The lower projections 35 and upper projection 36 are respectively provided with an external face 35b, 36b and an internal face 35c, 36c, said external faces 35b, 36b being provided at a region of their radial peripheral edge with a respective stop projection 37, which act as a locking stop for a mounting means 40 to be described below, the internal faces 35c, 36c being shaped so as to respectively define an upper wall and a lower wall of the receiving housing 32.

Each stop projection 37 has a respective contact face 37a facing the lateral wall of the larger eye 31, the end portions of the mounting means 40 acting against said contact face and lateral wall, promoting the fastening of the connecting rod portions, after said connecting rod has been disposed in the compressor.

The articulation of the connecting rod can be obtained by providing the second connecting rod portion 30 with the engaging element 23, in this case said second connecting rod portion 30 carrying part of the rod 22 of the connecting rod.

Nevertheless, the more the articulation region is spaced from the center of the larger eye 31, the higher will be the transversal efforts to which this articulation region is submitted, generating moments.

The mounting of the engaging element 23 to the receiving housing 32 provides for a flexible and self-adjustable coupling of the connecting rod portions, allowing an ideal axial spacing between both eyes of said two-piece connecting rod, when the latter is disposed in a reciprocating hermetic compressor, without requiring the use of additional external mechanisms for controlling the relative position between the components of the two-piece connecting rod during this constructive step of the compressor.

After the engagement between the first and second connecting rod portions 20, 30, the two-piece connecting rod receives the mounting means 40, which is preferably in the form of a flexible clamp, maintaining under constant pressure the engaging element 23 against the receiving housing 32.

In the preferred illustrated form, the flexible clamp 40 is in the form of a thin "U" shaped plate or body having a base portion 41, wherefrom a pair of legs 42 are projected, said legs being shaped and spaced from each other in such a way as to surround the respective portion of the engaging element 23 that projects laterally from the connecting rod 22, said legs 42 having a respective end portion 42a provided with a bend, so that, in the mounting condition of the flexible clamp 40 to the two-piece connecting rod, the end of each end portion 42a keeps contact with the corresponding contact face 37a of the stop projection 37, said end portions 42a being substantially orthogonal to the respective contact faces 37a. In the preferred illustrated construction, each end portion 42a is bent transversely to the longitudinal length of the legs 42, so that said end portions 42a be kept substantially parallel to the geometrical axis of the rod 22 of the connecting rod. The distance between the legs 42 of the flexible clamp 40 is at least slightly larger than the width of the rod 22 of the connecting rod, in order to allow the mounting of the flexible clamp 40 to said rod 22, during the assembly of the two-piece connecting rod, surrounding the engaging element 23 and retaining the latter tightly against the receiving housing 32.

The base portion 41 of the flexible clamp 40 is in the form of a continuous body, with a width substantially concurrent with the width of the engaging element 23 and having an end 41a, which is opposite to that end wherefrom the legs 42 are projected and which is provided with a bend, to be seated against the respective contact face 37a of the stop projection 37 of the upper projection 36, as described above with respect to the bend provided at the end portion of each leg 42.

This bend region avoids, during the movement of the piston, that the flexible clamp 40 escapes from its operative position, keeping both first and second connecting rod portions 20, 30 united. The existence of the bend makes the flexible clamp 40 return to a position of balance, keeping together the portions of the two-piece connecting rod, whenever said portions are subjected to forces acting to separate them. The bend region creates a spring like effect in the flexible clamp 40 and also dampens more abrupt movements that may occur between the portions of the connecting rod and said flexible clamp 40. The above described construction for the end portion 42a of the leg 42 provides for a more effective actuation of the flexible clamp 40 as a connecting element of the portions of the two-piece connecting rod in the presence of radial forces on said connecting rod portions acting to separate said portions. Such radial forces usually exist during the operation of the compressor and result from the rotation of the crankshaft. The movement of rotation of the crankshaft causes an oscillating movement of translation in the two-piece connecting rod, making the second connecting rod portion 30, during part of said oscillating movement, move in a direction that tends to provoke the separation of this portion in relation to the first portion 20.

The actuation of the flexible clamp 40 avoids, during this phase of the translational movement of the two-piece connecting rod, that the second connecting rod portion 30 separates from the first connecting rod portion 20, also avoiding the relative movements between said portions due to the clearances existing therebetween in the mounting of the two-piece connecting rod in the compressor.

The mounting procedure of the two-piece connecting rod of the present invention will be described below, observing the related figures for a better understanding.

The crankshaft 7 is introduced into the bearing 6 through the upper side of the block 4. The larger eye 31 of the two-piece connecting rod is then mounted over the eccentric pin 11. With the valve plate 17 and the head 18 of the cylinder being removed, the piston 10 and the cylindric pin 15, already mounted, are introduced into the cylinder 9 through the free end 19. This assembly is then moved towards the other part of the two-piece connecting rod, at the same time that it can spun inside the cylinder, in order to allow a perfect coupling between the first and second connecting rod portions 20, 30. The engagement between the first and second connecting rod portions 20, 30 is obtained in this solution in a direction of displacement of the involved parts that is parallel to and coincides with the longitudinal axis of the two-piece connecting rod. After the first and second connecting rod portions 20, 30 have been individually disposed in the respective part of the compressor, said portions are approached, so that the engaging element 23 be introduced into the receiving housing 32, till the condition of mutual contact has been reached. This introduction is correctly achieved by the actuation of the lateral guide element 24, close to the internal lateral walls of the lower radial projections 35 of the receiving housing 32.

After obtaining the contact between the engaging element 23 and the bottom wall of the receiving housing 32, the fastening of the parts of the two-piece connecting rod takes place, by mounting the flexible clamp 40 to the assembly. In this step, said flexible clamp 40 is led, through an adequate device, onto the joining region of said connecting rod portions, in such a way that the free end 41a of the base portion 41 of said flexible clamp 40 reaches the contact face 37a of the stop projection 37 of the upper projection 36 of the second connecting rod portion 30. After this contact, said end portion 42a of each leg 42 is caused to meet each respective contact face 37a of the stop projection 37 of each of the lower projections 35. Said contact is obtained by an elastic deformation of the flexible clamp 40.

I claim:

1. A two-piece connecting rod for a reciprocating hermetic compressor comprising:

a first connecting rod portion, including a smaller eye and at least part of a rod of the connecting rod, a second connecting rod portion, including a larger eye;

an engaging element at one of the first and second connecting rod portions, a receiving housing at the other of said first and second connecting rod portions and shaped to articulately receive during the assembly of the connecting rod said engaging element to permit articulation between said first and second rod connecting portions on a diametral plane common to both the eyes and the geometrical axis of the rod, said receiving housing including at least a pair of opposite lateral walls defined by lower and upper radial projections that are axially spaced one from the other and disposed to prevent relative movements between said first and second connecting rod portions in a plane orthogonal to said diametral plane; and mounting means, having engaging portions carried by one of said first and second connecting rod portions, and acting on the other of said portions to prevent said portions from moving away from each other by involuntary mutual axial spacing at said common diametral plane, said engaging element having a lateral guide element that guides said engaging element during the mounting thereof to said receiving housing through lateral walls of a through axial slot provided on one of the lateral walls of the receiving housing.

2. A two-piece connecting rod, as in claim 1, wherein said engaging element includes lateral portions, orthogonally projecting from the common diametral plane.

3. A two-piece connecting rod, as in claim 1, wherein said lateral guide element is defined by a lateral wall portion of said rod and has a thickness equal to the difference between the thickness (E) of said rod and the diameter of said engaging element.

4. A two-piece connecting rod, as in claim 3, wherein the lower and upper radial projections of said receiving housing project from the lateral surface of the larger eye, an axial slot on the lateral wall of the receiving housing being defined by the spacing between the lower radial projections, each said lower and upper radial projection having a respective internal wall defining a circular transversal profile for the receiving housing.

5. A two-piece connecting rod, as in claim 4, wherein the mounting means comprises a flexible clamp with a "U" profile surrounding the lateral portions of the engaging element, orthogonally projecting from the diametral plane and with its end portions acting against respective stop projections provided on the lateral wall of the larger eye.

6. A two-piece connecting rod, as in claim 5, wherein said radial projections are providing on each respective external wall of a respective stop projection to receive and retain the corresponding end portion of the flexible clamp.

* * * * *